Patented May 16, 1950

2,508,208

UNITED STATES PATENT OFFICE 2,508,208

METHOD OF PRODUCING QUARTZ CRYSTAL

Nora A. Wooster and William A. Wooster, Cambridge, England, assignors to Hazeltine Research, Inc., Chicago, Ill., a corporation of Illinois No Drawing. Application April 4, 1947, Serial No. 739,364. In Great Britain October 31, 1945

16 Claims. (Cl. 23—301)

This invention relates to a method of producing a quartz crystal and to the quartz crystal produced by such a method. The present invention is particularly applicable to the production of quartz crystals of substantial size such, for example, as are suitable for cutting into piezoelectric elements for use in oscillation generators.

To supply the rapidly increasing demand for piezo-electric elements used in radio and other electrical circuits, a very great number of bars and plates of suitable configuration have been cut from naturally occurring quartz crystals. These naturally occurring crystals, however, are subject to imperfections of numerous types and there are only a few sources of such crystals of usable quality and size. It usually is most convenient to ship these crystals long distances in a raw state, and a large proportion of the material shipped must be scrapped during the cutting and finishing operations. Although attempts have been made to grow or otherwise manufacture quartz crystals, it hitherto has been found possible to produce during a reasonable length of time only crystals which are far too small for practical utilization.

It is an object of the present invention, therefore, to provide a quartz crystal produced by a new and improved method which substantially avoids one or more of the limitations of the described prior sources of supply of such crystals.

It is a further object of the invention to provide a method of producing quartz crystals of useful size and quality which does not rely on a source of supply of naturally occurring quartz crystals.

In accordance with the invention, the method of producing a quartz crystal comprises heating in a pressure vessel fused silica, a crystalline seed of quartz, and an aqueous solution of a water-soluble salt of a silicic acid. In a preferred form of the invention the heating is continued to provide a temperature of between 300 and 400 degrees centigrade, and preferably there is used a quantity of the aqueous solution sufficient to obtain at that temperature a pressure of between 400 and 800 atmospheres.

For a better understanding of the present invention, together with other and further objects thereof, reference is had to the following description, and its scope will be pointed out in the appended claims.

In carrying out the method of producing a quartz crystal according to the present invention, the desired materials are placed in a pressure vessel or autoclave arranged to be heated to and maintained at an elevated temperature, preferably a temperature of between 300 and 400 degrees centigrade. It has been found that a temperature of between approximately 350 and 360 degrees centigrade is particularly desirable in the method of the present invention.

The materials placed in the pressure vessel include fused silica, that is, silica in the vitreous form, and a crystalline seed of quartz. There also is placed in the pressure vessel an aqueous solution of a water-soluble salt of a silicic acid. This aqueous solution is one in which fused silica is readily soluble and is more soluble than is quartz at elevated temperatures and at high pressures. The alkaline metasilicates, for example, sodium metasilicate ($Na_2SiO_3$), are particularly suitable for the aqueous solution. However, the aqueous silicate solution may be formed during the heating by reaction of other compounds with the fused silica. For example, sodium hydroxide placed initially in the pressure vessel reacts during the heating with the fused silica to form a soluble silicate, thus providing the desired aqueous solution of a water-soluble salt of a silicic acid.

To obtain at the elevated temperature a desirable pressure, and thus to maintain the water in the vessel in a condition of appropriately high density, it is preferable to use a quantity of the aqueous solution sufficient to cause the solution substantially completely to fill the available volume in the pressure vessel as the heating progresses. By available volume is meant the corrected internal volume of the bomb, that is, the actual volume of the space within the vessel with deductions made for space occupied by the fused silica, seed crystal, support wires, and any other space-occupying inclusions. The quantity of the aqueous solution used preferably is such that at room temperature the ratio of the available volume in the vessel to the volume of the solution is between about 1.3 and 1.4. Heating may then be carried out to obtain at an appropriate temperature a pressure which has been found roughly to be between 400 and 800 atmospheres.

During the heating in accordance with the described method it is found that the seed of quartz grows at the expense of the fused silica by deposition on the seed. This method may, if required, be repeated several times with successive charging of fused silica and of the solution in order successively to build up the crystalline seed to a quartz crystal of a required relatively large size. Alternatively, the method may be repeated so that each time there is built up to a required size a fresh seed formed by cutting from the crystal produced during the preceding operation. The original seed may be one formed by the method of the present invention or it may be a seed cut from a natural quartz crystal. It will be appreciated that the process in accordance with the invention may have both for building up completely artificial crystals and for building up to larger size small, naturally occurring quartz crystals.

In order to increase the rate at which the crystal growth takes place, it is preferred to use in the pressure vessel an aqueous solution containing a mineralizer, that is, a crystal growth promoter. A water-soluble fluoride mineralizer, for example sodium fluoride (NaF) or potassium fluoride (KF), is recommended. Particularly suitable are the corresponding acid salts or alkaline hydrogen fluorides, that is, potassium hydrogen fluoride ($KHF_2$) and sodium hydrogen fluoride ($NaHF_2$). An appreciable concentration of mineralizer, for example at least 10 grams per liter, appears to be desirable. Other satisfactory mineralizers are sodium tungstate ($Na_2WO_4$) and sodium dihydrogen orthophosphate ($NaH_2PO_4$).

The details of one embodiment of the method of the invention now will be described. The autoclave used is a steel pressure vessel or bomb of cylindrical shape and about 500 cubic centimeters in internal volume. The vessel has a lid, adapted to be screwed down by means of steel bolts, and a steel gasket or sealing ring between the lid and the body of the vessel. Into this vessel is placed an aqueous solution containing an alkaline metasilicate, more specifically sodium metasilicate in a preferred concentration of about 25 grams per liter, and containing potassium hydrogen fluoride in a preferred concentration of about 125 grams per liter. Fused silica in the form of four rods, each about 5 centimeters long and one centimeter in diameter, and a seed of crystalline quartz, for example in the form of a plate about 40 by 30 millimeters by one millimeter thick, are supported in the vessel by a cradle of copper or silver wire. The remaining available space is filled with a quantity of the aqueous solution such that the ratio of that space to the volume of the solution is between 1.3 and 1.4. The lid of the bomb then is tightly screwed on and the vessel heated in an oven to a temperature of between 350 degrees and 360 degrees centigrade for about 18 hours.

It is found on cooling and opening the vessel that the thickness of the seed crystal has increased appreciably. The particular method described often results in a doubling of the thickness of the crystal. The time of heating is not critical, and appreciable growth of the seed crystal may be obtained with shorter heating periods, for example, 6 hours. Of course, in general and within limits, the longer the period of heating the greater will be the growth of the crystal.

With this method, as the temperature of the vessel is raised, the water expands at a rate which is greater than that of the pressure vessel and eventually completely fills the internal volume of the vessel. Thereafter any further expansion of the fluid in the vessel is determined solely by the expansion of the vessel itself, thus generating a very high pressure. It may be remarked in this connection that the higher the pressure developed the more rapidly is the quartz deposited from solution, but that the lower the rate of deposition of quartz the better is the quality of the crystal so formed. It also may be remarked that the lower the temperature to which the vessel is heated the slower is the rate of growth of the seed, but that the higher the temperature is maintained the greater is the tendency of the fused silica to devitrify in situ without dissolving. It has been discovered that at temperatures appreciably below 300 degrees centigrade the rate of crystallization is very slow, while at temperatures appreciably above 400 degrees centigrade the fused silica often is converted directly into an undesirable form of quartz without passing into solution, so that the growth of the seed is limited.

The seed crystal may be introduced as aforesaid in the form of a plate and preferably is held by wires fitting into nicks cut into the sides of the plate. If the plate is cut from a mother crystal approximately parallel to a positive rhombohedral face thereof, the growth is such that the seed develops mainly by increasing its thickness, the major surfaces becoming more parallel to the positive rhombohedral face. However, the seed may be introduced in other forms, for example, in a ground spherical shape on which silica is deposited to form a double-ended quartz pyramid having rhombohedral faces.

Experience has shown that the supporting wires for the fused silica and the crystalline seed should be as small as possible. Furthermore, best results have been obtained when the inner sides of the pressure vessel are covered by a layer of crystalline quartz. This layer may be obtained by deposition from the solution. Thus is appears desirable to perform one or two heating operations, using the fused silica and the silicate solution, to obtain such a layer before actually commencing the growth of a seed.

The differential solubility of the fused silica and quartz in some cases may be accentuated by placing the fused silica and the seed crystal in rather widely separated parts of the pressure vessel. The vessel then is heated nonuniformly so that the part at which the silica is located is hotter than the part at which the seed crystal is located.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A method of producing a quartz crystal comprising, heating in a pressure vessel fused silica, a crystalline seed of quartz, and an aqueous solution of a water-soluble salt of a silicic acid.

2. A method of producing a quartz crystal comprising, heating in a pressure vessel to a temperature of between 300 and 400 degrees centigrade fused silica, a crystalline seed of quartz, and an aqueous solution of a water-soluble salt of a silicic acid.

3. A method of producing a quartz crystal comprising, heating in a pressure vessel to a temperature of between approximately 350 and 360 degrees centigrade fused silica, a crystalline seed of quartz, and an aqueous solution of a water-soluble salt of a silicic acid.

4. A method of producing a quartz crystal comprising, heating in a pressure vessel fused silica, a crystalline seed of quartz, and a quantity of an aqueous solution of a water-soluble salt of a silicic acid sufficient to cause said solution substantially completely to fill the available volume in said vessel as said heating progresses.

5. A method of producing a quartz crystal comprising, heating in a pressure vessel to a temperature of between 300 and 400 degrees centigrade fused silica, a crystalline seed of quartz, and a quantity of an aqueous solution of a water-soluble salt of a silica acid sufficient to cause said solution substantially completely to fill the available volume in said vessel as said heating progresses.

6. A method of producing a quartz crystal comprising, heating in a pressure vessel fused silica, a crystalline seed of quartz, and a quantity of an aqueous solution of a water-soluble salt of a silicic acid such that at room temperature the ratio of the available volume in said vessel to the volume of said solution is between about 1.3 and 1.4

7. A method of producing a quartz crystal comprising, heating in a pressure vessel to a temperature of between 300 and 400 degrees centigrade fused silica, a crystalline seed of quartz, and a quantity of an aqueous solution of a water-soluble salt of a silicic acid such that at room temperature the ratio of the available volume in said vessel to the volume of said solution is between about 1.3 and 1.4.

8. A method of producing a quartz crystal comprising, heating in a pressure vessel fused silica, a crystalline seed of quartz, and an aqueous solution of an alkaline metasilicate.

9. A method of producing a quartz crystal comprising, heating in a pressure vessel fused silica, a crystalline seed of quartz, and an aqueous solution of sodium metasilicate.

10. A method of producing a quartz crystal comrising, heating in a pressure vessel fused silica, a crystalline seed of quartz, and an aqueous solution containing about 25 grams per liter of sodium metasilicate.

11. A method of producing a quartz crystal comprising, heating in a pressure vessel fused silica, a crystalline seed of quartz, and an aqueous solution containing a crystal growth promoter and a water-soluble salt of a silicic acid.

12. A method of producing a quartz crystal comprising, heating in a pressure vessel fused silica, a crystalline seed of quartz, and an aqueous solution containing a water-soluble salt of a silicic acid and a water-soluble fluoride crystal growth promoter.

13. A method of producing a quartz crystal comprising, heating in a pressure vessel fused silica, a crystalline seed of quartz, and an aqueous solution containing a water-soluble salt of a silicic acid and at least 10 grams per liter of an alkaline hydrogen fluoride crystal growth promoter.

14. A method of producing a quartz crystal comprising, heating in a pressure vessel to a temperature of between 300 and 400 degrees centigrade fused silica, a crystalline seed of quartz, and a quantity of an aqueous solution containing an alkaline metasilicate and a water-soluble fluoride crystal growth promoter such that at room temperature the ratio of the available volume in said vessel to the volume of said solution is between about 1.3 and 1.4.

15. A method of producing a quartz crystal comprising, heating in a pressure vessel to a temperature of between 300 and 400 degrees centigrade fused silica, a crystalline seed of quartz, and a quantity of an aqueous solution containing about 25 grams per liter of sodium metasilicate and about 125 grams per liter of potassium hydrogen fluoride crystal growth promoter such that at room temperature the ratio of the available volume in said vessel to the volume of said solution is between about 1.3 and 1.4.

16. A method of producing a quartz crystal comprising, heating fused silica, a crystalline seed of quartz, and an aqueous solution of a water-soluble salt of a silicic acid in a pressure vessel the inner sides of which are covered by a layer of crystalline quartz.

NORA A. WOOSTER.
WILLIAM A. WOOSTER.

REFERENCES CITED

The following references are of record in the file of this patent:

UNITED STATES PATENTS

| Number | Name | Date |
|---|---|---|
| 2,459,869 | Christensen | Jan. 25, 1949 |

OTHER REFERENCES

Kerr et al., "Recorded Experiments in the Production of Quartz," Bulletin of Geological Society of America, vol. 54, Supplement 1, April 1, 1943, pp. 1–33.

Mellor, "Comprehensive Treatise on Inorganic and Theoretical Chemistry," Longmans, Green and Co., London, 1925, pp. 237–239 and 288.